Patented May 27, 1947

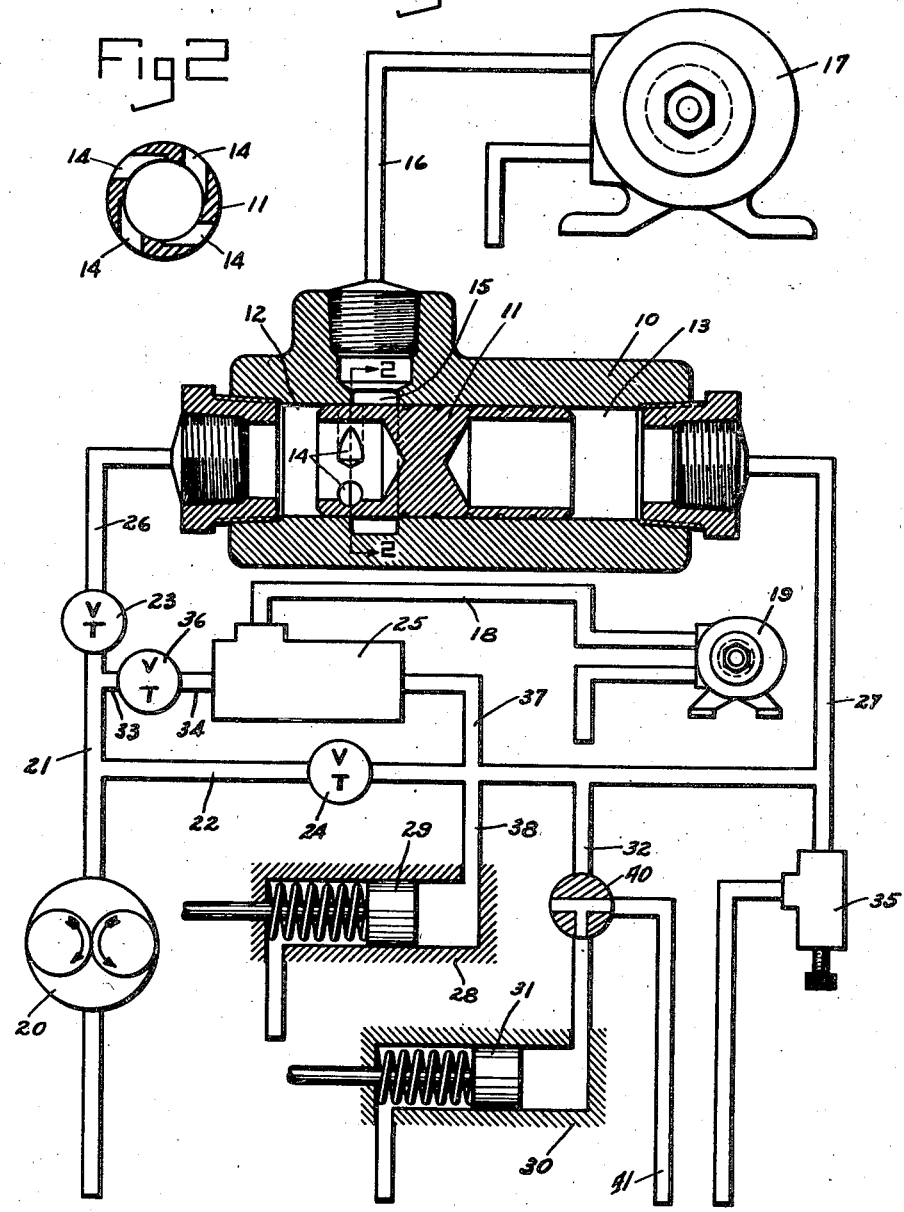

2,421,219

UNITED STATES PATENT OFFICE 2,421,219

BALANCING VALVE

Ralph E. Price, Highfield, Md., assignor to Landis Tool Company, Waynesboro, Pa.

Application March 4, 1942, Serial No. 433,365

2 Claims. (Cl. 60—97)

This invention relates to hydraulic systems, particularly those wherein one or more of the hydraulically operated devices must be driven at a constant speed.

In hydraulic systems having a plurality of operated mechanisms supplied from a single source, the operation of a device such as a work rest, a foot-stock, or a chuck which occurs during the operation of continuously operated mechanisms requires a substantially constant pressure. The rate of movement of such a device is not important. Operation of these devices would cause a change in speed of another device in the same system whose function requires more or less continuous operation at a substantially constant speed, such as a traverse mechanism or a work drive mechanism. However, change in load on the constant speed mechanism will cause fluctuation in pressure on the constant pressure device. This is just as objectionable as interference with the constant speed mechanism.

There are disclosed in the prior art a few devices whose purpose is to maintain a constant flow of fluid under pressure. This result is obtained solely by dividing the supply of fluid, directing part of it thru a restriction to the driven mechanism, and another part to the exhaust. The effect of this is to maintain a balance of pressure in the metering means of the fluid going to the driven mechanism and in that of the fluid to be bypassed. This type of system permits the use of only one driven mechanism under the desired conditions such as constant speed or constant pressure. The introduction of even one additional device would interfere with the desired functioning of the first.

By dividing the output of a pump between the constant speed mechanism and the constant pressure mechanisms, and by providing a device to maintain a pressure in the supply line to the constant speed circuit equal to the pressure in the constant pressure circuit, a constant flow of fluid under pressure may be maintained to the constant speed device so long as the pressure required therefor does not exceed that of the constant pressure circuit. Also, a constant force may be exerted in the operation of the back rest, foot-stock, chuck or other constant pressure device.

It is therefore an object of my invention to provide a hydraulic system wherein one or more mechanisms may be driven at a constant speed regardless of the varying resistance of these mechanisms, regardless of the viscosity of the fluid, and regardless of other mechanisms in the system so long as the pressure required is less than that for which the relief valve is set under that required for the other constant pressure mechanisms.

A further object is to provide a hydraulic system having both constant speed mechanisms and constant pressure mechanisms.

Figure 1 is a sectional elevation of a balancing valve shown in conjunction with a hydraulic system having constant speed mechanisms and constant pressure mechanisms.

Figure 2 is a section on the line 2—2 of Figure 1.

In the drawings, numeral 10 indicates a valve body, and 11 a valve member slidably mounted in the bore thereof. Said valve is cylindrical in shape and divides the bore into two chambers 12 and 13. In one end of said valve are tangential passages 14 thru the wall of the cylinder. Said passages permit fluid under pressure to enter port 15 from said valve and to pass from there thru passage 16 to constant speed motor 17. Another constant speed motor 19 receives through 18, fluid under pressure from valve 25 which is identical with valve 10. Fluid is directed to said valve from line 21 thru line 33, restriction 36 and line 34. The other end of valve 25 is connected to constant pressure line 27 thru line 37.

Fluid under pressure for said system is supplied by a constant delivery pump 20 thru branch lines 21 and 26 and lines 22 and 27 respectively to opposite ends of valve 11. Restrictions 23 and 24 in lines 21 and 22 respectively, are in the form of throttle valves although restriction 24 need not be adjustable.

Constant pressure devices consisting of cylinders 28 and 30 and pistons 29 and 31 respectively therein are connected by lines 38 and 32 to line 27 between restriction 24 and valve body 10. A valve 40 serves to connect cylinder 30 with pressure line 32 or exhaust line 41. A relief valve 35 is connected to the same portion of line 27.

Operation

Fluid under pressure from pump 20 passes thru restrictions 23 and 24. The pressure exerted by the constant pressure portion of the circuit which is established by relief valve 35 is imposed on the right end of valve 11. The pressure in line 27 must be greater at all times than the pressure required to maintain a constant flow of fluid to motor 17. Since chamber 12 of valve body 10 is equal in area to chamber 13 of valve body 10, it is obvious that valve 11 will assume a position in relation to port 15 to maintain a pressure in chamber 12 equal to that in 13. It is also obvious that the pressure in chamber 12 can be maintained equal to that in chamber 13 only by a flow thru valve 23 sufficient to maintain a pressure drop from line 21 to line 26 equal to that from line 22 to 27, and that in order for this flow to occur valve 11 must assume a position in relation to port 15 to allow just that amount of flow. Any more than sufficient opening between valve 11 and port 15 would result in a greater pressure drop between lines 21 and 26 than between 22 and 27 which would result in more pressure in chamber 13 than chamber 12 which would tend to close the port 15 and thus increase pressure in chamber 12. Any less than sufficient opening between valve 11 and port 15 would result in a less pressure drop between line 21 and 26 than between 22 and 27 which would result in less pressure in chamber 13 than in chamber 12 which would tend to open port 15 and decrease pressure in line 26 until it is substantially the same as in line 27. Thus with the pressure in line 26 maintained equal to the pressure in line 27, the pressure drop across the two valves 23 and 24 is maintained equal and the flow will be approximately proportional to the openings in these restrictions. Any tendency to a drop in pressure in the system as a result of fluid used to shift pistons 29 and 31 would be transmitted thru valve 11 to effect a corresponding drop in pressure in line 26. There would be no change in the volume of fluid supplied to motor 17 because valve 11, in response to the pressure change in line 27 would move to the right and thus increase the size of port openings 14. This would permit the same volume of flow at the reduced pressure.

I claim:

1. In a hydraulic system, a pump, hydraulically operated devices which require a constant pressure, other hydraulic devices which function at a constant rate of speed, a relief valve for maintaining said constant pressure, means for supplying a constant volume of fluid under pressure to the constant speed devices including a branch from the pump output for the constant pressure devices, a separate branch for each constant speed device, a restricting means in each of said branches and means including a valve in the constant speed branch for maintaining pressure in the supply to the constant speed branch equal to that in the supply to the constant pressure branch.

2. In a hydraulic system, a pump, a plurality of hydraulically operated devices supplied from said pump, some of said devices requiring fluid to be supplied at a constant pressure, a relief valve for maintaining such constant pressure, other of said devices being operable at a constant speed and therefore requiring a constant volume of fluid, a divided conduit for directing fluid from said pump to each of said devices, a restriction in each division of said conduit for determining the volume of fluid for each device, a line connecting corresponding sides of said restrictions, a valve in said line including a housing a piston therein having equal areas at opposite ends thereof, the ends of said piston being subjected to the pressures existing at said corresponding sides of said valve, an outlet from said housing for supplying one of said constant speed devices, said valve being effective to vary the size of said outlet in response to change in pressure at either end of said piston, whereby to maintain a constant volume of flow therethru.

RALPH E. PRICE.

REFERENCES CITED

The following references are of record in the file of this patent:

UNITED STATES PATENTS

| Number | Name | Date |
|---|---|---|
| 2,005,731 | Ernst | June 25, 1935 |
| 1,972,462 | Schafer | Sept. 4, 1934 |
| 2,102,865 | Vickers | Dec. 21, 1937 |
| 2,111,964 | Crane | Mar. 22, 1938 |
| 2,166,940 | Conradson | July 25, 1939 |
| 2,272,684 | Vickers | Feb. 10, 1942 |
| 2,223,838 | Tweedale | Dec. 3, 1940 |
| 2,255,787 | Kendrick | Sept. 16, 1941 |
| 1,999,834 | Ernst | Apr. 30, 1935 |